Nov. 9, 1954 D. E. TAYLOR 2,694,108
MAGNETIC RECORDING AND REPRODUCING SYSTEM
Filed Aug. 30, 1949
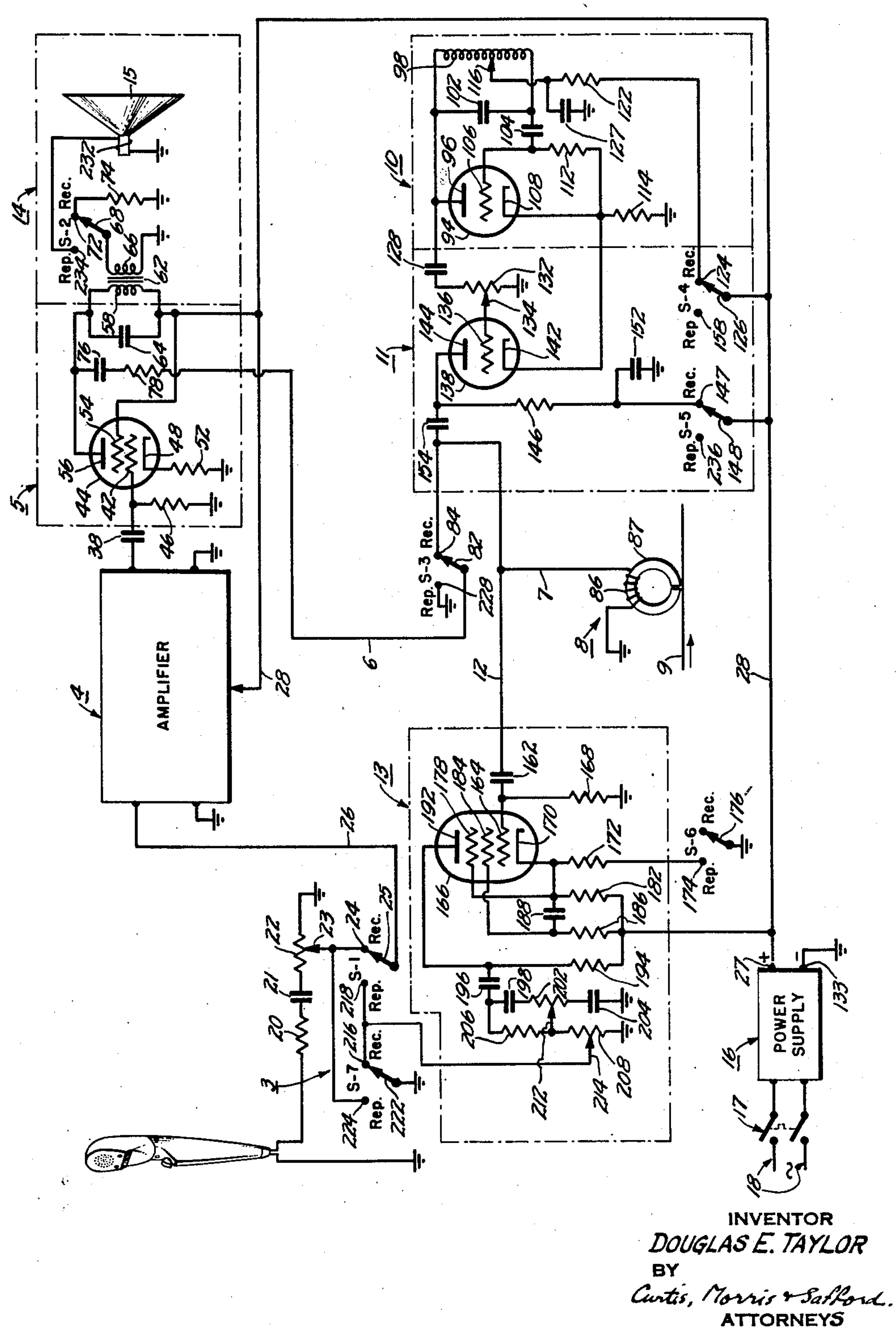
INVENTOR
DOUGLAS E. TAYLOR
BY
Curtis, Morris & Safford.
ATTORNEYS 2,694,108
Patented Nov. 9, 1954

2,694,108

MAGNETIC RECORDING AND REPRODUCING SYSTEM

Douglas E. Taylor, Southport, Conn., assignor to Dictaphone Corporation, Bridgeport, Conn.

Application August 30, 1949, Serial No. 113,123

9 Claims. (Cl. 179—100.2)

This invention relates to sound recording and reproducing systems using magnetic records; and particularly to apparatus for simplifying and improving the operation of such systems wherein a single translating unit or "head" is used both for recording and reproducing.

In some magnetic recording systems, the signals to be recorded are applied to the magnetic record medium by means of a recording head and are reproduced therefrom by a separate reproducing head. It is possible, however, to use a single head to perform both of these functions, thereby simplifying the apparatus and lowering its cost. Such single-head arrangements are particularly desirable in dictating machines, because of the saving in space made possible by the use of a single head, and the reduction in manufacturing costs resulting from simplification of the head-supporting and moving structure.

Some difficulties are encountered, however, when a single head is used both for recording and reproducing. For example, in order to obtain improved magnetic recording characteristics, it is common practice to apply a high-frequency bias signal to the record medium during recording simultaneously with the sound signal which is being recorded. Although the frequency of this signal is above the audible frequency range, when such a high-frequency bias method is used in a system having only a single head for recording and reproducing, noisy and distorted reproduction may result. Such noise and distortion is caused by residual magnetism in the head. When the same magnetic circuit or core is used both for recording and reproducing, the high-frequency bias signal is disconnected from the head at the same time that the head is switched from the recording circuit to the reproducing circuit. If the high-frequency bias signal at the instant of switching is of such value that the core of the head is magnetized thereby at that instant, the core will be left partially magnetized, and this residual magnetism will remain in the core throughout the subsequent reproduction. Even though this residual magnetism is small, it may be of sufficient magnitude to introduce a magnetic bias in the operation of the head as a reproducing unit causing it to operate on a non-linear portion of its magnetization characteristic and thus introducing distortion and noise in the reproduced signal.

If the magnetic core of the head is carefully and properly annealed, the residual magnetism retained by the core under normal operating conditions may be so low that no particularly harmful effects will be observed. However, in quantity production, where cost and speed of production are major considerations, it is difficult to be certain that the characteristics of each core assembled into a recording head are satisfactory. Unsatisfactory operation may result because the core was improperly annealed in the first instance, or because the subsequent working of the metal of the core, which to some extent necessarily accompanies handling and assembly, may have changed the characteristics of the core material so that optimum magnetic characteristics are not obtained.

In accordance with this invention, a recording and reproducing system is provided, in which any residual magnetism is positively removed from the core each time the record-reproduce control lever of the machine is manipulated to switch the machine from recording to reproducing condition, this demagnetization being accomplished in such manner that it is effectively completed before actual reproduction takes place, and without requiring any additional manipulations by the operator. The present invention accordingly resides in apparatus for improving the operation of magnetic recording and reproducing systems wherein a common magnetic circuit is employed for both recording and reproducing. One aspect of the invention is concerned with preventing the retention of residual magnetsim in the magnetic core when the recording bias signal is removed. Another aspect relates to features whereby the improved system is adapted particularly for dictating machines. Another feature of the invention relates to apparatus whereby the efficiency of a coupling circuit, which transfers the signals from the bias signal generator to the recording head, is gradually attenuated at the termination of the recording operation while the bias signal continues to be applied to the coupling circuit. Still another aspect of the invention relates to a simplified switching arrangement for acomplishing the foregoing results.

Additional aspects and advantages of the invention will be in part pointed out, and in part apparent from a consideration of the following description considered in conjunction with the accompanying drawing, which shows, diagrammatically, the electrical circuits of a magnetic-record recording-reproducing system embodying the invention.

The circuit diagram shown in the drawings is such as might be used in a magnetic-record type dictating machine, for example, the dictating machine described in U. S. patent application Serial No. 767,210, filed August 7, 1947. In this machine a single head is utilized both for recording and reproducing.

When the apparatus is conditioned for recording, sound waves are picked up by a hand microphone 2 and converted into an electrical signal, which is fed through a switching arrangement, generally indicated at 3, into a conventional electronic audio-frequency amplifier, indicated in block form at 4. The output signal from amplifier 4 is fed into a power amplifier stage, generally indicated at 5, which further amplifies the signal and feeds it through leads 6 and 7 to a recording head, generally indicated at 8, which is arranged to record the signal on a moving magnetic record medium 9.

During the recording operation a high-frequency bias signal, produced by a signal generator, generally indicated at 10, passes through a coupling stage, generally indicated at 11, whose purpose will be explained later, and is applied to the recording head 8 simultaneously with the signal to be recorded from power amplifier stage 5.

When the apparatus is switched from record to reproduce condition, the bias-signal source is disconnected, in a manner to be explained later, and the signal induced in head 8 by the moving magnetic record 9 is fed, by a lead 12, into a pre-amplifier stage, generally indicated at 13, which is used only during reproduction because the relatively weak signal picked up by head 8 requires greater amplification than does the signal delivered by the microphone 2. The output signal from pre-amplifier 13 is fed through the switching arrangement 3, amplifier 4, and the power amplifier stage 5, as in recording, and the amplified signal is applied to an output circuit, generally indicated at 14, which includes a loudspeaker 15.

Power for this apparatus used for recording and reproducing is provided from a conventional rectifier-filter power supply, generally indicated in block form at 16, which is connected through a switch 17 to alternating current supply lines 18.

A plurality of switches S–1, S–2, S–3, S–4, S–5, S–6, and S–7, provided to change the circuit from recording to reproducing condition, are shown in recording position. In practice, the switches are ganged together (either mechanically or electrically) and are controlled by a manually operable lever (not shown), such as that disclosed in the above-mentioned application, which conditions the machine for recording or reproducing.

The recording portion of the illustrated apparatus will now be described in greater detail. One terminal of the hand microphone 2, which is conveniently provided with a switch 19 (connections for which are not shown) for starting and stopping the machine, is connected to a common ground circuit and the other microphone terminal is connected through a resistor 20 and a coupling condenser 21 to one end of a potentiometer 22, which serves as a volume level control during recording. The opposite end of the potentiometer 22 is connected to ground and its sliding contact 23 is connected to contact point 24 of switch S–1, arm 25 of which is connected through a lead 26 to the input circuit of the audio amplifier 4.

Amplifier 4 is energized from the power supply 16, the positive terminal 27 of which is connected to the amplifier through a lead 28, the negative terminal 33 of the power supply 16 being connected thereto through the common ground circuit.

The output signal from amplifier 4 is fed through a coupling condenser 38 to a control grid 42 of a pentode amplifier tube 44 in the power amplifier stage 5, a ground return circuit being provided from grid 42 through a resistor 46. The cathode 48 of this tube is connected to ground through a bias resistor 52, the screen grid 54 is connected directly to the positive voltage lead 28, and the anode 56 is connected to lead 28 through a load circuit comprising a primary winding 58 of an audio-output transformer 62, connected in parallel with a stabilizing condenser 64. When the apparatus is in recording condition, as shown, the secondary winding 66 of the transformer 62 is connected through switch arm 68 and contact point 72 of switch S–2 and a dummy load resistor 74 to ground.

The audio signal developed across the anode load circuit of power amplifier tube 44 is fed through a coupling condenser 76, a series resistor 78, and arm 82 and contact point 84 of switch S–3 to the winding 86 of the recording-reproducing head 8, to induce correspondingly varying magnetic flux in its core 87.

The high frequency signal generator, or oscillator, generally indicated at 10, which provides the high-frequency bias signal that is applied to the recording head 8 simultaneously with the audio signal, comprises an oscillator tube 94, the anode 96 of which is connected to one end of a parallel resonant circuit comprising an inductance 98 and a parallel-connected condenser 102. The opposite end of this resonant circuit is connected through a condenser 104 to the control grid 106 of tube 94, and to its cathode 108 through a resistor 112, the cathode being connected to ground through a resistor 114. Positive voltage is provided for oscillator circuit 10 by a connection from a tap 116 on the coil 98, through a series resistor 122 and contact point 124 and arm 126 of switch S–4 to the positive voltage supply lead 28. A condenser 127 is connected from the coil tap 116 to ground and, in conjunction with the resistor 122, forms a time-delay circuit whose function will be described later.

The signal produced by the signal generator 10 is applied from anode 96 of the oscillator tube 94 through a coupling condenser 128 to one end of a gain-control potentiometer 132, the opposite end of which is connected to ground. The adjustable contact 134 of the potentiometer 132 is connected to a control grid 136 of a triode amplifier tube 138 of the coupling stage 11. The cathode 142 of this tube is connected through the resistor 114 to ground in common with the cathode circuit of the oscillator tube 94. The anode 144 is connected through a plate load resistor 146, and contact point 147 and arm 148 of switch S–5 to the positive voltage supply lead 28. A condenser 152 is connected between contact point 147 and ground, and in conjunction with the resistor 146 forms part of a second time-delay circuit whose function will be explained hereinafter.

The signal developed across load resistor 146 is coupled from the anode 144 of tube 138 through a condenser 154 to the winding 86 of the recording-reproducing head 8.

The coupling stage 11 between the signal generator 10 and the head 8 can be made either to amplify or to attenuate the high frequency bias signal produced by signal generator 10, dependent upon the desired operating condition, by suitable adjustment of the contact 134 of the potentiometer 132. The function of this coupling stage will be explained more fully later.

When the control lever (not shown) is switched from the recording to the reproducing position, all of the switches S–1 through S–7 are changed from the positions shown in the drawing to their alternate positions. The recording-reproducing head 8 now picks up the signal previously recorded on the magnetic record medium 9.

This signal, which is induced in the winding 86 of the head 8, is fed by the lead 12 and a coupling condenser 162 to a control grid 164 of a pentode vacuum tube 166 of the pre-amplifier stage 13, a grid return circuit being provided by a resistor 168 connected between grid 164 and ground. The cathode 170 of this tube is connected to ground through a bias resistor 172 and contact point 174 and arm 176 of the switch S–6, which is provided to render this pre-amplifier stage inoperative during recording when it is not required. The suppressor grid 178 of pre-amplifier tube 166 is connected to the cathode 170, which is connected also to the positive supply lead 28 through a voltage-dropping resistor 182, and the screen grid 184 is connected to the positive supply lead 28 through a resistor 186 and is bypassed to the cathode 170 by a condenser 188. This pre-amplifier stage 13 is completed by a connection from anode 192 through a plate-load resistor 194 to the positive voltage supply lead 28.

The amplified signal which appears on anode 192 is coupled through a condenser 196 to volume and tone control circuits, which comprise two parallel branches. The tone control circuit includes a condenser 198, a potentiometer 202, and a condenser 204 connected in series between condenser 196 and ground. The volume control circuit includes a resistor 206 connected in series with a potentiometer 208 between condenser 196 and ground. The sliding contact 212 of the tone control potentiometer 202 is connected to the junction of resistor 206 and potentiometer 208 in the volume control branch.

The sliding contact 214 of the reproducing volume control potentiometer 208 is connected to contact point 216 of switch S–7 and to contact point 218 of switch S–1. When the apparatus is in recording position, the arm 222 of switch S–7 connects the output of amplifier tube 192 to ground to prevent any noise, or other undesirable signals, from being impressed on the recording system. When the switches are in the reproducing position, arm 222 of switch S–7 is connected to the contact point 224, grounding the signal from microphone 2, and the reproduced signal is applied through the contact point 218 and the arm 25 of the switch S–1 to the input circuit of the audio-frequency amplifier 4.

The circuits associated with the output of amplifier 4 function as described above in connection with the recording operation, except that the signal from power amplifier tube 44 is applied to the voice coil 232 of the loudspeaker 15 through the arm 68 and contact point 234 of switch S–2, and no signal is applied to the head 8 through condenser 76, because arm 82 of switch S–3 is now connected to terminal 228, which is grounded.

The operation of the above-described system during the recording process is similar to the conventional systems heretofore known. However, when the control lever (not shown) is moved to the reproduce position, the magnetic core 87 of the recorder-producer head 8 is automatically and positively demagnetized. In order to accomplish this, the gain of the tube 138 is controlled, in this example, by gradually reducing its plate voltage so that the high-frequency bias signal appearing at anode 144 gradually decreases to zero.

When switch arm 148 of switch S–5 is moved from contact point 147 to contact point 236 (simultaneously with corresponding movement of all of the switches S–1 to S–7), the plate voltage is not removed instantly from coupling tube 138, because of the condenser 152, which has been charged to the full potential of the positive voltage supply lead 28. However, as the condenser 152 discharges through the resistor 146 and tube 138, the anode potential, and accordingly the amplitude of the bias signal passing therethrough is gradually decreased. If this period of gradual attenuation occurs during the time required for 50 to 100 cycles of the oscillator frequency satisfactory results are obtained under ordinary operating conditions.

If the signal generator 10 were caused to stop oscillating abruptly before the coupling circuit had sufficiently attenuated the signal, irregular wave forms of considerable magnitude might be produced by the signal generator at its cessation of oscillation which would interfere with proper demagnetization of the core 87 of head 8. Accordingly, the signal generator 10 is caused to stop oscillating only after the coupling has been suitably attenuated, by the gradual removal of plate voltage from the coupling tube 138. This is accomplished by providing the condenser 127 with a much larger capacity than the condenser 152, so that when switch arm 126 of switch S-4 is moved from terminal 124 to terminal 158 to disconnect the signal generator 10 from the positive voltage supply lead 28, the signal generator 10 is caused to continue oscillating for a period of time substantially longer than that required to discharge condenser 152, and transients or unusual wave forms occurring at the cessation of oscillations in signal generator 10, will not be impressed on winding 86, and the core will accordingly be fully demagnetized by the gradual attenuation to zero of the bias signal applied thereto. The period of time required for the demagnetization is, at most, a few hundred cycles, so that the whole operation can take place in a small fraction of a second. Thus, there is no possibility that interference between the recording and reproducing circuits will be caused by these time delay circuits. In one typical embodiment of the invention, the condenser 152 had a value of 0.05 microfarad with a load resistance 146 of 27,000 ohms; while, in the signal generator circuit 10, the condenser 127 had a value of 10.0 microfarads and the resistor 122 had a value of 100,000 ohms.

Thus, it will be seen that the above-described embodiment of this invention is well adapted to carry out the ends and objects hereinbefore set forth. Although only a single embodiment of the invention has been described, it is apparent that it can be modified so as to best suit the needs of a particular use, and that certain features of the invention can at times be used to advantage without a corresponding use of other features. It is to be understood, therefore, that the example set forth above is for the purpose of teaching those familiar with this art the principles of the present invention and how to apply them for their particular uses, and is not intended to be limiting of the invention or an exhaustic analysis of all its possible forms or uses.

I claim:

1. Apparatus for improving the quality of the reproduced signals in a magnetic recording and reproducing system including a recording head having a common magnetic circuit used both for recording and reproducing, and an amplifier system coupled to said magnetic circuit for amplifying signals when recording and when reproducing, said apparatus including a signal generator circuit producing a supersonic bias signal, a coupling circuit including an electronic amplifier stage extending between said generator and said head arranged to impress said bias signal on said magnetic circuit, a source of potential to energize said amplifier stage, a switch arranged to cut off said source of energization from said amplifier stage to render said coupling circuit inoperative, and energy storage means arranged to maintain energization of said electronic amplifier with gradually decreasing energization voltage for a predetermined period after said switch is actuated, whereby the transfer efficiency of said amplifier stage is gradually reduced to zero as said energization voltage is reduced, thus attenuating to zero the supersonic bias signal impressed on said magnetic circuit.

2. Apparatus for improving the quality of the reproduced signals in a magnetic recording and reproducing system including a recording head having a common magnetic circuit used both for recording and reproducing, and an amplifier coupled to said magnetic circuit for amplifying signals to be recorded by said head and for amplifying signals picked-up by said head, said apparatus including switch means having a first position for conditioning said apparatus for recording and a second position for conditioning said apparatus for reproducing, a signal generator producing a supersonic bias signal, and a coupling circuit including an electronic amplifier stage extending from said generator to said head and being arranged to impress said bias signal on said magnetic circuit, a supply of energization potential connectable to said amplifier stage, said coupling circuit including energy storage means for temporarily maintaining the energization voltage of said amplifier stage, a second switch under the control of said switch means arranged to cut off the energization potential supply from said amplifier stage to enable the energization voltage from said energy storage means to decrease gradually the transfer efficiency of said coupling circuit effectively to zero value over a predetermined period.

3. In a magnetic recording and reproducing system including a head in which the same magnetic circuit is used alternatively both for recording and reproducing, apparatus for improving the quality of the reproduced signals including first switch means having a first position in which said apparatus is conditioned for recording and a second position in which said apparatus is conditioned for reproducing, an electronic signal generator for producing a bias signal of frequency above the recording range utilized by the system, a coupling circuit including an electronic amplifier extending from said generator to said head arranged to impress said bias signal on said magnetic circuit, second switch means under control of said first switch means for deenergizing said generator and the electronic amplifier in said coupling circuit when said first switch means is changed from its first position, and energy storage means for maintaining energization of the electronic amplifier in said coupling circuit with gradually decreasing energizing voltage for a predetermined period after said generator has been deenergized.

4. In a magnetic recording and reproducing system including a recording-reproducing head having a common magnetic circuit that is used both for recording and reproducing, apparatus for improving the quality of the reproduced signals including an electronic signal generator for producing a high-frequency bias signal switch means for deenergizing said signal generator, energy storage means under the control of said switch means for maintaining operation of said generator for a first predetermined period after actuation of said switch, a coupling circuit including an electronic amplifier connected to said generator and to said head for impressing said bias signal on said magnetic circuit, a source of energization voltage for said electronic amplifier, second switch means arranged to disconnect said source of energization voltage from said amplifier, and a time-delay circuit associated with said second switch means and forming part of said coupling circuit for gradually decreasing the transfer efficiency of said coupling circuit over a second predetermined period shorter than said first predetermined period, and means rendering said second switch means and time delay circuit operative upon actuation of said switch means.

5. In an office type dictating machine having a single head in which the same magnetic circuit is used for magnetically recording and reproducing sound signals, apparatus for improving the quality of the reproduced signals including a signal generator circuit for producing high frequency bias signals, a coupling circuit connected from said generator to said head for coupling said bias signals to said magnetic circuit, a power source for energizing said generator and coupling circuits, switch means having first and second positions for conditioning said machine for recording and reproducing, respectively, said switch means being arranged to disconnect said power source from said generator and coupling circuits when moved from said first position, first energy storage means for maintaining operation of said generator for a first predetermined period after said switch means is actuated from said first position, and second energy storage means for maintaining operation of said coupling circuit with gradually increasing attenuation for a second predetermined period after said switch means is moved from said first position, said energy storage devices being so proportioned that said second period is shorter than said first period.

6. In a dictating machine having a single head in which the same ferromagnetic circuit is used both for recording and for reproducing sound signals, apparatus for improving the quality of the reproduced signals including a vacuum tube oscillator circuit for generating a high frequency bias signal, a coupling stage comprising vacuum tube amplification means for coupling said bias signal from said generator to said magnetic circuit, manually adjustable means for regulating the gain of said coupling stage, power supply means for energizing said generator and said coupling stage, switch means having first and second positions in which said machine is conditioned for recording and for reproducing, respectively, said switch means being arranged to disconnect said power supply means simultaneously from said generator and from said coupling stage when moved from said first position, first energy storage means comprising a first condenser and discharge circuit for maintaining operation of said generator for a first predetermined period after said switch means is actuated from said first position, and second energy storage means comprising a second condenser and discharge circuit for maintaining operation of said coupling stage with gradually decreasing gain for a second predetermined period after said switch means is actuated from said first position, said condensers and discharge circuits having values such that said second period is shorter than said first period, whereby when said switch means is moved from said first position, said coupling stage and said oscillator are sequentially rendered ineffective and residual magnetism in said magnetic circuit is reduced effectively to zero value.

7. In a dictating machine having a single head with a common magnetic circuit used both during the recording and during the reproducing of sound signals, apparatus for improving the quality of the reproduced signals including an amplifier system coupled to said magnetic circuit for amplifying signals to be recorded and signals picked up by said head, a signal generator circuit for producing supersonic bias signals, a coupling stage comprising a vacuum tube amplifier for coupling said bias signals to said magnetic circuit, a power source for energizing said generator and coupling stage, switch means having first and second positions for conditioning said machine for recording and reproducing, respectively, said switch means being arranged to disconnect said power source from said generator and said coupling stage when moved from said first position, first energy storage means for maintaining operation of said generator for a first predetermined period after said switch means is actuated from said first position, and second energy storage means for maintaining operation of said coupling stage with gradually increasing attenuation for a second predetermined period after said switch means is actuated from said first position, said first and second energy storage means being so proportioned that said second period of time is at least equal to the period of fifty cycles of said bias signals and shorter than said first period, whereby when said switch means is moved from said first position, said coupling stage and said generator are sequentially rendered ineffective and residual magnetism in said magnetic circuit is reduced effectively to zero value.

8. In a dictating machine having a single head with a common magnetic circuit used both for recording and for reproducing sound signals, apparatus for eliminating the residual magnetism in said magnetic circuit each time said machine is changed from recording to reproducing condition, said apparatus including a signal generator for producing a supersonic bias signal, a coupling stage comprising a vacuum tube amplifier for coupling said bias signal to said magnetic circuit, a power source for energizing said signal generator and said coupling stage, switch means having first and second positions for conditoning said machine for recording and reproducing, respectively, said switch means being arranged to disconnect said power source from said signal generator and from said coupling stage when moved from said first position, first energy storage means comprising a first condenser and charging and discharging circuits therefor for maintaining operation of said generator for a first predetermined period after said switch means is actuated from said first position, and second energy storage means comprising a second capacitor and charging and discharging circuits therefor for maintaining operation of said coupling stage with gradually increasing attentuation for a second predetermined period after said switch means is actuated from said first position, said first and second capacitors and discharging circuits having values so proportioned that said second period of time is at least as long as the time required for 50 cycles of said bias signal and shorter than said first period, whereby when said switch means is moved from said first position, said coupling stage and signal generator are sequentially rendered ineffective and residual magnetism in said magnetic circuit is reduced effectively to zero value.

9. In a dictating machine wherein sound signals are recorded on and reproduced from a magnetizable material, the combination including an audio amplifier having input and output circuits, a microphone, a recording and reproducing head having a magnetic core and a winding for inducing magnetic flux within said core, said winding being coupled to said audio amplifier, switch means having recording and reproducing positions, said switch means being arranged to couple said microphone to an input circuit of said audio amplifier and said winding to an output circuit of said amplifier when in the recording position, and to couple said winding to an input circuit of said amplifier and said microphone to an output of said amplifier when in the reproducing position, a supersonic bias-signal generator comprising a first vacuum tube having a cathode, an anode, and a control electrode, a bias-amplifier coupling stage comprising a second vacuum tube having a cathode, an anode, and a control electrode, said second vacuum tube having its control electrode coupled to said generator and its anode coupled to said winding, a source of power, a first circuit extending from said power source to said generator and including a first condenser arranged to be charged thereby, a second circuit extending from said power source to said bias-amplifier coupling stage and including a second condenser arranged to be charged thereby, said circuits being under the control of said switch means and arranged to be disconnected from said power source when said switch means is moved from the recording position, whereby said first condenser maintains the operation of said generator for a first predetermined period after movement of said switch means from said recording position, and said second condenser maintains operation of said bias-amplifier coupling stage with gradually decreasing gain for a second predetermined period after movement of said switch means from said recording position, the values of said condensers being such that said first predetermined period is longer than said second period, whereby said magnetic core is relieved of residual magnetism each time said switch means is moved from the recording position.

References Cited in the file of this patent

UNITED STATES PATENTS

| Number | Name | Date |
|---|---|---|
| 2,336,886 | Peterson | Dec. 14, 1943 |
| 2,418,541 | Camras | Apr. 8, 1947 |
| 2,531,141 | Lootens | Nov. 21, 1950 |
| 2,604,548 | Begun | July 22, 1952 |

FOREIGN PATENTS

| Number | Country | Date |
|---|---|---|
| 97,306 | Sweden | Nov. 1, 1939 |
| 636,578 | Great Britain | May 3, 1950 |